United States Patent Office 3,795,655
Patented Mar. 5, 1974

3,795,655
SULFUR-VULCANIZABLE ELASTOMER MIX-
TURES AND OXIDATION-RESISTANT VUL-
CANIZATES THEREOF
Claire D. Le Claire and John C. Baker, Dover, Del.,
assignors to Polysar International, S.A., Fribourg, Switzerland
No Drawing. Filed Jan. 28, 1972, Ser. No. 221,789
Int. Cl. C08c 11/44, 11/54; C08d 5/00
U.S. Cl. 260—45.8 N
9 Claims

ABSTRACT OF THE DISCLOSURE

A sulfur-vulcanizable elastomer mixture capable of forming vulcanizates, which substantially retain their elastic and tensile properties upon prolonged exposure to high temperatures under oxidative conditions, comprising (a) a sulfur-vulcanizable elastomer, (b) sulfur, (c) a bivalent metal oxide activator system containing magnesium oxide and another bivalent metal oxide, (d) tetra-$C_{1-4}$-alkyl thiuram disulfide and (e) an antioxidant system comprising a mixture of polyether polythioether and aryl amine.

---

This invention relates to vulcanizable specialty rubber compositions which, upon vulcanization, exhibit quite high resistance to change in their elastomeric properties upon exposure to high temperatures. More particularly, the invention relates to such compositions which, upon vulcanization, retain a high degree of flexibility even when exposed to high temperatures under oxidizing conditions.

A major use for specialty rubbers is in the automotive industry where such rubbers find use as O-ring seals and gaskets. In such applications, the rubber must frequently have good resistance to oil for one surface and good resistance to air oxidation for another surface. In such applications, the rubber must of course remain both strong and flexible in order to retain its effectiveness as a sealing medium. In other words, it must retain a major degree of its tensile strength and elongation properties and incur a minimum increase in hardness.

In recent years, the environmental temperature of rubber in use under the hood of automobiles, especially those made in the U.S., has increased quite markedly due to the proliferation of higher engine compression ratios (and thus higher engine operating temperatures) and more auxiliary equipment, particularly air conditioning equipment. Whereas, operating temperatures were formerly on the order of 200–250° F., they now approach and even exceed 300° F.

At temperatures such as these, there are tremendous oxidative and thermal degradational stresses which tend to decompose the rubber exposed thereto. Typically, conventional sulfur-vulcanizable elastomers lose their flexibility and strength under such conditions and become relatively inflexible and even brittle. Obviously, such changes in physical properties reduce the capability of the rubber to function effectively in gasketing and sealing applications.

Such high temperature requirements have frequently required the use of more exotic and therefore more expensive synthetic elastomers such as silicone rubber, acrylate rubber, polytetrafluoroethylene and other elastomeric polymers containing no carbon-to-carbon unsaturation in the polymer chain.

Applicants' invention, however, overcomes the disadvantages of the prior art in that it extends the useful operating temperature range of conventional sulfur-vulcanizable rubber systems by 50° F. or more, even under conditions in which the rubber is exposed to atmospheric oxidation for prolonged periods of time.

Applicants' invention is a sulfur-vulcanizable elastomer mixture, which is vulcanizable to form vulcanizates having both high heat resistance and good low temperature flexibility, comprising (a) a sulfur-vulcanizable elastomer and, basis 100 parts by weight of the elastomer, (b) 0.02–2.0 parts of sulfur, (c) a bivalent metal oxide activator system comprising 2–20 parts of MgO and 2–10 parts of another bivalent metal oxide, (d) 0.2–8 parts of tetra-$C_{1-4}$-alkyl thiuram disulfide and (e) 1–15 parts of a mixture of antioxidants comprising (1) a polyether polythioether and (2) an aromatic amine in which mixture the weight ratio of (1) to (2) is from about 1:1 to about 10:1.

The sulfur-vulcanizable elastomers useful in the invention include a wide selection of both aliphatic and cyclic diene-containing polymers. Among these are included conjugated aliphatic diene homopolymers such as polybutadiene, cis-polyisoprene, and polychloroprene and conjugated aliphatic diene-containing bipolymers and higher multipolymers such as copolymers of butadiene with secondary monomers such as acrylonitrile, styrene, lower alkyl acrylates and methacrylates, ethylenically unsaturated carboxylic acids and N-alkylol acrylamides. Butyl rubbers, which are essentially copolymers of isobutylene with butadiene, are useful in the invention as well as non-conjugated diene-containing rubbers such as the ethylene/propylene/diene monomer (EPDM) rubbers. The EPDM rubbers are esentially terpolymers of ethylene and propylene with a non-conjugated aliphatic or cyclic diene, e.g. 1,4-hexadiene, 2-alkyl-2,5-norbornadiene, 5-methylene-norbornene, dicyclopentadiene and 1,5-cyclooctadiene.

The above-described elastomers are prepared by conventional polymerization methods including both solution and aqueous emulsion polymerization. In the former case, the solid polymer is separated by either coagulation, e.g. with steam, by removal of the solvent with heat or by combinations of the two procedures. In the latter case, the solid polymer is separated by coagulation of the emulsified polymer particles in the latex. Latex emulsion coagulation is usually accomplished by (a) lowering the pH of the latex to pH 2–5 with the addition of a strong acid such as sulfuric or hydrochloric acid and (b) then admixing with the acidified latex a coagulating agent such as sodium chloride, calcium chloride, alum, polyethyleneimine or cationic polymeric materials such as those described in U.S. Pat. 3,632,507.

By the term "sulfur," as used herein, is meant elemental sulfur as well as organic sulfur-containing compounds which under vulcanizing conditions release or donate sulfur to the vulcanization reaction. Among the latter sulfur-containing compounds are sulfur donors such as 4,4'-dithiodimorpholine and alkyl phenol disulfides. Whether the sulfur is added as elemental sulfur or by use of a sulfur donor, the amount of available sulfur should be from about 0.02 to about 2.0 parts by weight, basis 100 parts by weight of sulfur vulcanizable polymer. Ordinarily, from about 0.2 to about 1.0 parts by weight are preferred to avoid excessively fast curing. On some rubber stocks the rate of vulcanization may be excessive as compared with others in which case from about 0.2 to about 0.5 available sulfur is preferred to avoid scorchiness.

As an accelerator for the vulcanization reaction, tetra-alkyl thiuranm disulfides are used. These compounds have the following structure:

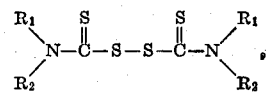

in which the R groups are either the same or different lower ($C_{1-4}$) alkyl groups. Mixed $C_{1-4}$-tetraalkyl thiuram disulfides are preferred and mixed $C_{1-2}$-tetraalkyl thiuram disulfides are particularly preferred to obtain optimum high temperature aging properties, especially when used in amounts equivalent to from about 0.2 to about 8 parts by weight, basis 100 parts by weight of sulfur vulcanizable polymer.

In the practice of the invention to obtain further activation and improved properties, a bivalent metal oxide accelerator activator system is used comprising a primary activator, which may be either zinc oxide or, preferably, cadmium oxide, and a secondary activator which is magnesium oxide. The activator system, as described above, is added in an amount such that at least about 4 parts and no more than about 30 parts by weight, basis 100 parts of sulfur vulcanizable elastomer, are contained in the system. The primary activator should be used in concentration of from about 2 to about 10 parts by weight and the secondary activator in concentration of from about 2 to about 20 parts by weight. It is preferred to employ at least about 5 parts by weight of the magnesium oxide since lesser amounts contribute to excessive reduction of the elastic properties of the polymer upon aging. While up to 20 parts by weight of the secondary activator are operable, no particular further advantage seems to be obtained beyond about 10 parts by weight.

A most important aspect of the composition of the invention is the unique antioxidant system therefor which is comprised of a mixture of (1) a polyether polythioether and (2) aromatic amine antioxidant(s).

The polyether polythioethers which are useful in the practice of the invention are of the types disclosed in U.S. Pat. 3,163,620, viz. of the following general formula:

in which $R_1$ and $R_{10}$ each represent a hydrogen atom, a cycloalkyl, acyl or aryl radical or preferably an alkyl radical containing from 1 to 22 carbon atoms; $R_2$ to $R_9$ each represent a hydrogen atom or an alkyl, cycloalkyl or aryl radical; $m$ and $q$ are integers from 0 to 50 and $n$ and $p$ are integers from 1 to 50.

Compounds of the general Formula 1 may be prepared by condensing a $\beta,\beta'$-dihydroxy alkyl sulfide with a polyalkylene glycol and/or alcohol according to the process described in United States patent specification No. 2,582,605. Preferred polyether polythioethers of the General Formula 1 are those having terminal alkyl groups, such as those obtained by condensing a dihydroxy alkyl sulfide with an aliphatic alcohol.

Particularly preferred polyether polythioethers are obtained by condensing a dihydroxy alkyl sulfide with itself and with an oxalkylated aliphatic alcohol in the presence of an acid or a compound having an acid reaction or which will form an acid under the reaction conditions. The polyether polythioethers formed in this way have the following General Formula 2:

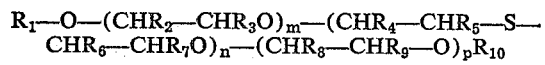

in which $R_1$ and $R_{10}$ each represent a linear or branched alkyl radical containing from 1 to 22 and preferably from 3 to 18 carbon atoms; $R_2$, $R_3$, $R_4$, $R_5$, $R_6$, $R_7$, $R_8$ and $R_9$, which may be the same or different, each represent a hydrogen atom or a linear or branched alkyl radical containing from 1 to 12 carbon atoms; and $m$, $n$ and $p$ are integers from 1 to 10 and preferably from 1 to 5.

The aromatic amine component of the antioxidant mixture may be any of a number of high boiling aromatic amines including octylated diphenyl amines, lower polymers, e.g. trimer, of 2,2,4-trimethyl-1,2-dihydroquinoline, 2 - mercaptobenzimidazole, N,N'-di-$\beta$-naphthyl-p-phenylenediamine, condensation products of aniline and $\beta$-naphthol, condensation products of diphenylamine and acetone, N,N' - diphenyl-p-phenylenediamine, phenyl-$\alpha$-naphthylamine resin phenyl-$\beta$-naphthylamine and the like. Mixture of the aromatic amines may be, of course, used to advantage. Particularly preferred antioxidants of this type are the trimer of 2,2,4-trimethyl-1,2-dihydroquinoline and 2-mercaptobenzimidazole either singly or preferably in admixture.

From about 1 to about 15 parts by weight, basis the sulfur vulcanizable elastomer, of the antioxidant mixture may be used, in which mixture it is preferred that the weight ratio of polyether polythioether to aromatic amine be between about 1:1 and about 10:1. It is preferred that the compositions of the invention contain at least about 1 part by weight of the polyether polythioether and it is even further preferred to use at least about 2 parts by weight, basis elastomer.

An important characteristic of the above-described antioxidant mixture is that it may be emulsified with water and added to the latex from which the elastomer is prepared by coagulation of the dispersion with a coagulating agent such as sodium chloride, calcium chloride, alum, polyethyleneimine or cationic polymeric materials such as those described in U.S. Pat. 3,632,507. It has been found that addition of the antioxidant mixture prior to coagulation advantageously protects the rubber from oxidation during the drying step prior to milling. Though the latices useful in the invention themselves frequently contain antioxidants, it is not usual to add the antioxidant system for the rubber prior to coagulation.

The invention will be more clearly understood by reference to the following examples:

EXAMPLE I

An emulsion of a polymer of butadiene and acrylonitrile is prepared by aqueous emulsion polymerization in the following manner:

To an enclosed, stirred and jacketed reaction vessel containing 180 parts by weight of water blanketed with inert gas was added an anionic emulsifier system comprising potassium hydroxide, primary and secondary emulsifiers, an electrolyte buffer and oxygen scavenger. Upon addition of the emulsifier system, a mixture of 21 parts by weight of acrylonitrile and 0.5 part by weight of alkyl mercaptan-type modifier were charged. When the acrylonitrile charge was completed, 74 parts by weight of butadiene were added, the temperature of the charge was adjusted to about 50° F. and 0.1 part by weight of an organic peroxide free radical initiator was added to the charge. Upon completion of the free radical initiator addition, a mixture of $FeSO_4$ and sodium formaldehyde sulfoxylate was added to the charge, upon which polymerization was initiated. Periodic addition of $FeSO_4$ and sodium formaldehyde sulfoxylate was made until conversion of the monomers reached about 70%. The pH of the reaction mixture was maintained at between 10 and 10.5. The temperature of the reaction mixture was then raised to about 55° F. and polymerization was terminated at about 82–84% conversion by the addition of a shortstop agent, hydroxylamine sulfate.

Because of a slight pH drop during polymerization, the pH was again adjusted to between 9.8 and 10.2 by the addition of potassium hydroxide. The polymer dispersion was then stripped by the injection of steam under vacuum conditions to remove unreacted monomers and to concentrate the dispersion to 32–35% by weight solids (basis dry polymer).

EXAMPLE II

An aqueous dispersion of antioxidant mixture was prepared in the following manner:

To 100 parts by weight of polyether polythioether, heated to 180° F., was added 12.5 parts by weight of aryl amine antioxidant (trimer of 2,2,4-trimethyl-1,2-dihydroquinoline). The mixture was stirred until the components were mutually dissolved and then added to a 10% solution of ammonium oleate modifier so as to form a mixture containing 6 parts by weight of the ammonium oleate, basis 100 parts by weight of polyether polythioether. The aqueous admixture of antioxidants and emulsifier was agitated under high shear conditions to form a thorough dispersion and 0.6 part by weight oleic acid dissolved in 27 parts by weight water was added. The resultant admixture was agitated under high shear conditions to form an homogenous dispersion, with ammonium hydroxide being added as necessary to maintain the pH of the antioxidant dispersion between 9.5 and 10.5.

EXAMPLE III

To a portion of latex produced in the manner of Example I was added an amount of the antioxidant dispersion, as produced in Example II, sufficient to provide 9 parts by weight of the antioxidant mixture, basis 100 parts by weight of dry polymer solids. In this instance, 1 part by weight each of octylated diphenylamine, 2-mercaptobenzimidazole and N,N'-$\beta$-naphthyl-p-phenylenediamine were added in the form of aqueous dispersions to act as supplemental antioxidants.

The above-described latex containing the antioxidants was then coagulated to produce a dry rubber in the following manner:

(1) The pH of the latex was adjusted to 2.8–3.2 by the addition of $H_2SO_4$;

(2) About 0.25 part by weight of cationic polymeric coagulating agent as described in U.S. Pat. 3,632,507 was slowly added to the acidified latex, which resulted in complete coagulation of the polymer solids from the latex dispersion;

(3) The resultant coagulum was countercurrently washed with water;

(4) The washed wet coagulum (ca. 50% wt. water) was dried by passing it through a series of mechanical expellers and expanders to remove most of the moisture from the rubber; and (5) The flash-dried rubber containing from 1 to 2% wt. water was still further dried in an air-circulating oven until the moisture content reached about 0.5–0.75% wt.

EXAMPLE IV 100 parts by weight of the rubber produced in the manner of Example III was placed on a conventional two-roll mixing mill and compounded for curing by the addition of the following additional components:

| Sample designation | Milled component, amount (basis 100 parts by wt. polymer) | |
|---|---|---|
| | 1 | 3 |
| Sulfur (vulcanization agent) | 0.4 | 0.4 |
| Mixed $C_{1-2}$-tetraalkyl thiuram disulfide (primary accelerator) | 2.25 | 2.25 |
| n-Cyclohexyl-2-benzothiazole sulfenamide (secondary accelerator) | 1.75 | 1.75 |
| Zinc oxide (primary activator) | 3.0 | |
| Cadmium oxide (primary activator) | | 3.5 |
| Magnesium oxide (secondary activator) | 10.0 | 10.0 |
| Stearic acid (promoter) | 1.5 | 1.5 |
| Carbon black (reinforcing agent) | 50.0 | 50.0 |

Each of the above two compounded rubbers was oven cured at 325° F. until 100% cure was obtained as measured on a Monsanto Rheograph. From 3 to 5 samples each of the cured rubbers were then formed into Type C dumbbells and the tensile and elongation properties of each dumbbell was determined on one-half of each of the dumbbell samples. The remaining dumbbells were aged in an air-circulating oven for 72 hours at 300° F. at the conclusion of which the cooled samples were likewise measured as to their tensile and elongation properties. The results are shown in Table I below.

By way of comparison, a second set of tests was run in the same manner, but in which the polyether polythioether component of the antioxidant mixture was omitted. Thus, the rubbers produced therefrom contained none of the polyether polythioether as compared with 8 parts by weight in each of the previous samples. These results are likewise shown in the following table:

TABLE I

Effect of oxidative heat aging upon rubbers containing CdO and ZnO as primary activator

| | Sample designation | | | |
|---|---|---|---|---|
| | 1 | 2 | 3 | 4 |
| Primary activator | ZnO | ZnO | CdO | CdO |
| Polyether polythioether (phr.) | 8 | None | 8 | None |
| Tb, initial [1] | 2,715 | 3,021 | 2,450 | 2,583 |
| Tb, aged [1] | 1,675 | 1,008 | 2,325 | 2,295 |
| Percent loss | 38.3 | 70.5 | 5.6 | 11.2 |
| Eb, initial [2] | 596 | 502 | 346 | 266 |
| Eb, aged [2] | 138 | 70 | 248 | 175 |
| Percent loss | 76.9 | 86.5 | 28.3 | 34.2 |
| Hardness, aged [3] | 74 | 78 | 74 | 78 |

[1] Tb denotes tensile strength at break as measured on an Instron tensile tester per ASTM test procedure D-412-68.
[2] Eb denotes the percent elongation at break as measured on Instron tensile tester per ASTM test procedure D-412-68.
[3] Per ASTM test procedure D-2240-68.

The above data show that the polyether polythioether is quite effective in improving the aging characteristics of the rubber. While it improved the elongation at break only a modest degree in both the ZnO and CdO systems, the polyether polythioether reduced the loss of tensile strength at break of the aged samples by about 50% in both the ZnO and CdO containing rubbers. Moreover, hardness of the aged samples containing polyether polythioether was also desirably lower.

EXAMPLE V

A further series of rubbers was prepared in which the compounding and testing procedures of Example IV were followed. However, samples were prepared in which (1) the polyether polythioether, was omitted, (2) the magnesium oxide secondary activator was omitted or (3) both were omitted. By this means it was possible to observe the quite unexpected interaction of the polyether polythioether with the secondary activator.

TABLE II

Effect of polyether polythioether and secondary accelerator upon heat aging of rubbers containing CdO and ZnO primary activator systems

| | Sample designation | | | | | |
|---|---|---|---|---|---|---|
| | 5 | 6 | 7 | 8 | 9 | 10 |
| Primary activator | CdO | CdO | CdO | CdO | ZnO | ZnO |
| Polyether polythioether (phr.) | 8 | 8 | None | None | 8 | None |
| Secondary activator (phr. MgO) | 10 | None | 10 | None | 10 | 10 |
| Tb, initial | 2,450 | 2,222 | 2,583 | 2,515 | 2,715 | 3,021 |
| Tb, aged | 2,325 | 1,860 | 2,295 | 1,945 | 1,675 | 1,008 |
| Percent loss | 5.6 | 16.3 | 11.2 | 22.7 | 38.3 | 70.5 |
| Eb, initial | 346 | 356 | 266 | 290 | 596 | 502 |
| Eb, aged | 248 | 180 | 175 | 150 | 138 | 70 |
| Percent loss | 28.3 | 49.4 | 34.2 | 48.2 | 76.9 | 86.0 |

The above data show that the polyether polythioether and the magnesium oxide separately have a beneficial effect in that they reduce the loss of tensile strength upon aging. However, when they are used together, a marked synergistic effect is obtained by which the loss in tensile strength is reduced still further by 50 to 65%.

Interestingly, the polyether polythioether does not by itself seem to improve the loss of elongation upon aging. Nevertheless, in combination with the magnesium oxide secondary activator, it is effective to reduce the loss of elongation properties upon aging.

It is also interesting to note that the interaction between the polyether polythioether and the magnesium oxide is similar for both the CdO and ZnO activated systems even though it is obvious that the ZnO activated rubber does not possess nearly so good aging properties as the CdO-containing rubber. In the case of the ZnO-containing system, the beneficial effect of the combination of polyether polythioether with MgO upon the aged tensile strength is quite substantial, but is relatively minor with respect to reducing the loss in elongation properties upon aging.

EXAMPLE VI

In this example, a series of rubbers was tested to illustrate the principle that sulfur donors may be used as well as elemental sulfur as the primary vulcanization agent for the invention:

(A) Preparation of latex

A copolymer latex containing 68.5 parts by weight butadiene and 31.5 parts acrylonitrile was prepared by emulsion polymerization in the manner of Example I.

(B) Preparation of antioxidant mixture

An antioxidant mixture comprising 100 parts by weight polyether polythioether and 10 parts by weight of aryl amine antioxidant was prepared in the manner of Example II. The aryl amine antioxidant was a lower polymer, probably approximately a trimer, of 2,2,4-trimethyl-1,2-dihydroquinoline.

(C) Coagulation of the latex

To the latex described in A was added an amount of the antioxidant dispersion of B to provide 11 parts by weight of the antioxidant mixture, basis 100 dry parts of polymer solids. One part by weight each of 2-mercaptobenzimidazole and octylated diphenylamine were added as supplemental antioxidants. The thusly formulated latex was then coagulated and dried in the manner of Example III to produce a dry rubber containing the above-described antioxidant system.

(D) Compounding of the rubber

Three portions of the rubber produced per C were then compounded on a two-roll mixing mill by the addition of the following components:

| Sample designation | Milled component, amount (basis 100 parts by wt. polymer) | | |
|---|---|---|---|
| | 11 | 12 | 13 |
| Sulfur | 0.4 | | |
| 4,4'-dithiomorpholine | | [1] 0.3 | |
| Alkyl phenol disulfide | | | [1] 0.3 |
| Mixed $C_{1-2}$-tetraalkyl thiuram disulfide | 2.5 | 2.5 | 2.5 |
| N-cyclohexyl-2-benzothiazole sulfenamide | 2.0 | 2.0 | 2.0 |
| Trialkyl thiourea | 1.0 | 1.0 | 1.0 |
| Cadmium oxide | 7.5 | 7.5 | 7.5 |
| Magnesium oxide | 10.0 | 10.0 | 10.0 |
| Stearic acid | 1.5 | 1.5 | 1.5 |
| Carbon black | 40.0 | 40.0 | 40.0 |

[1] Basis sulfur content.

As in Example III, the three compounded rubbers—one compounded with sulfur and the other two with sulfur donors as the primary vulcanization agent—were cured and formed into dumbbells for tensile testing. The comparability of sulfur donors with sulfur itself in oxidative aging environments is shown in the following data from those tests:

TABLE III

Comparision of sulfur and sulfur donors as primary vulcanization agent

| Sample designation | 11 | 12 | 13 |
|---|---|---|---|
| Tb, initial | 1,417 | 2,052 | 2,025 |
| Tb, aged | 1,600 | 1,789 | 1,772 |
| Percent loss | None | 12.8 | 12.5 |
| Eb, initial | 450 | 800 | 840 |
| Eb, aged | 280 | 330 | 390 |
| Percent loss | 37.8 | 58.7 | 53.6 |

The use of sulfur in this particular instance actually yielded a rubber which underwent no loss of tensile strength upon aging and a relatively small loss of elongation at break. On the other hand, the sulfur donor-cured rubbers underwent small losses of tensile strength and larger losses of elongation at break upon aging. Nevertheless, the absolute values of tensile strength and elongation at break upon aging are superior for the two rubbers compounded with the sulfur donors. Thus, even though the relative loss of properites were greater, the sulfur donors nevertheless yielded rubbers having superior properties. It is evident therefore, that both sulfur and sulfur-containing organic compounds may be used in the sulfur-vulcanizable elastomers of the invention.

From the foregoing data and examples, it is apparent that the antioxidant mixture comprising the polyether polythioether and aromatic amines is vital with respect to the capability of the elastomer to retain its tensile properties upon aging. In this regard, it should be mentioned that these components in order to be effective must remain in the rubber when it is subjected to high temperatures and not be diffused out. Thus, the antioxidant system must (1) be reasonably compatible with the rubber and (2) be relatively non-volatile at the conditions of use.

Highere concentrations of antioxidants may be used to compensate partially for losses in volatilization. Nevertheless, it is preferred to employ antioxidants which are at least substantially non-volatile when exposed to 300° F. temperatures for prolonged periods of time. In particular, it is preferred that no more than about 40% of the antioxidants be volatilized upon 40 hours exposure to air at 300° F.

The use of cadmium oxide as an activator for rubber vulcanization is, of course, old and well known in the art of rubber compounding. In German Offenlegungschrift 2,023,890, published Nov. 19, 1970, it is proposed to formulate a sulfur-vulcanizable rubber having good high temperature aging properties comprising both cadmium oxide and magnesium oxide activators in conjunction with cadmium dialkyldithiocarbamate and an aryl amine antioxidant. Such rubbers appear to have good aging resistance under non-oxidative high temperature aging conditions. They do not, however, exhibit comparable resistance to heat aging under oxidative conditions. In particular, the rubbers of the invention have been found to retain higher elastic properties upon aging as is shown by the following example:

EXAMPLE VII

(A) Preparation of latex

A copolymer latex containing 74 parts by weight butadiene and 26 parts by weight acrylonitrile was prepared by emulsion polymerization in the manner of Example I.

(B) Preparation of antioxidant mixture

An antioxidant mixture comprising 100 parts by weight polyether polythioether and 12.5 parts by weight arylamine antioxidant was prepared in the manner of Example II.

(C) Coagulation of the latex

To a first portion of the latex described in A was added an amount of the antioxidant dispersion of B to provide 9 parts by weight of antioxidant mixture, basis 100 dry parts of polymer solids. In addition, the same further two aryl amine supplemental antioxidants as in Example III were added each at 1 part by weight. Thus, the latex contained 8 parts by weight polyether polythioether and 1 part by weight each of the three aryl amine antioxidants.

To a second portion of the latex described in A was added 1 part by weight of each of the three above-referred aryl amine antioxidants. However, the polyether polythioether of the invention was omitted.

Both of the above-described latices were then coagulated and dried separately in the manner of Example III to produce a quantity of dry synthetic rubber from each latex.

(D) Compounding of the rubber

Each of the above-described rubbers was then compounded as in the previous examples by addition of the following components onto a mixing mill:

| Sample designation | Milled component, amount (basis 100 parts by wt. polymer) | |
|---|---|---|
| | 14 | 15 |
| Sulfur | 0.4 | 0.4 |
| Mixed $C_{1-2}$-tetraalkyl thiuram disulfide | | 2.25 |
| Cadmium diethyldithiocarbamate | 2.0 | |
| n-Cyclohexyl-2-benzothiazole sulfenamide | | 1.75 |
| Mercaptobenzothiazole disulfide | 3.5 | |
| Cadmium oxide | 3.5 | 3.5 |
| Magnesium oxide | 10.0 | 10.0 |
| Stearic acid | 1.5 | 1.5 |
| Carbon black | 50.0 | 50.0 |

Each of the above two compounded rubbers was oven cured at 325° F. until 100% cure was obtained as measured on a Monsanto Rheograph. From 3 to 5 samples each of the cured rubbers were then formed into Type C dumbbells and then tensile and elongation properties of each dumbbell were determined in accordance with ASTM Testing Procedure D-412-68. In addition, the compression set of both rubbers was determined for separate samples of both rubbers prepared and tested in accordance with ASTM Testing Procedure D-395-69. The results are given in Table IV below:

TABLE IV

Comparison of elastic properties of rubbers produced in accordance with the invention and in accordance with Offenlegungschift 2,023,890

| Sample designation | 14 | 15 |
|---|---|---|
| Tb, initial | 2,134 | 2,287 |
| Tb, aged | 2,026 | 2,406 |
| Percent loss | 5.1 | None |
| Eb, initial | 308 | 273 |
| Eb, aged | 212 | 228 |
| Percent loss | 31.0 | 16.5 |
| Compression set | 59.1 | 41.9 |
| Hardness, aged | 72 | 76 |

The above data show that both rubbers had quite good heat aging properties. However, the rubber in accordance with applicants' invention exhibited both higher absolute tensile values as well as lower loss in tensile properties upon aging. Moreover, the rubbers made in accordance with the invention retained their elasticity better as is shown by (1) higher elongations at break, (2) lower loss of elongation at break after aging and (3) very significantly lower compression set after aging. In view of the facts that the polyether polythioether component of applicants' invention is known as a plasticizer and that it is well known in the art of rubber compounding that plasticizers tend to raise compression set values by their softening action on the polymer, it is indeed quite unexpected that the rubbers in accordance with applicants' invention should have such desirably lower compression set.

While the interaction of the components of the antioxidant mixture is not fully understood, it is believed that the polyether polythioether and aryl amine together (1) reduce chain reactions, which would normally take place upon oxidative aging, by reacting with available free radicals as they are formed and (2) reduce the formation of peroxides by converting bivalent oxygen linkages (—O—) to more stable sulfur-oxygen linkages (—S—O—). By this means, the action of each component complements and reinforces the action of the other, thus enabling the combination to be effective under oxidative conditions of high temperature.

EXAMPLE VIII

A most important property of solid rubbers is their processability. In particular, it is important in the production of vulcanized rubber to avoid premature vulcanization of the rubber while it is being mixed with the curing ingredients. Even partial precuring or "scorch" during mixing and processing must be avoided to allow the rubber mix to be worked properly on the mill, to be calendered into sheet, or to be shaped in molding, before it is cured or vulcanized.

The standard test used in the industry for determining the precure or scorch tendency of a rubber mix is referred to as the "Mooney Scorch Test" which utilizes a Mooney Shearing Disc Viscometer. The test is essentially a measurement of viscosity increase due to cross-linking of polymer chains which is the basic mechanism of vulcanization. Premature vulcanization occurring in the rubber mix is evidenced by an increase in Mooney viscosity of the rubber stock. In the test a shear is exerted on a rubber sample with a small rotor having a disc of 1.200 inch in diameter, with the sample heated to a temperature of 250° F. Increase in shear strength or viscosity is indicated by the difference in deflection of a dial gauge, the deflection of which is proportional to the true mean viscosity of the sample. The tendency to scorch is reported as the Mooney Scorch in minutes. This is the measured time required for a selected increase in deflection of the dial due to increase in viscosity of the sample. In the tests reported herein, the Mooney Scorch time is reported in minutes for a five (5) point increase in deflection, beyond which the viscosity tends to become too high for the rubber to be processed further, e.g. by forming, molding and calendering.

To observe the scorch properties of the rubbers of the invention in comparison with those containing cadmium diethyldithiocarbamate as primary accelerator, a quantity of rubber prepared in accordance with Example I, II and III was divided into two parts, one of which was compounded in accordance with the invention employing mixed $C_{1-2}$-tetraalkyl thiuram disulfides as the primary accelerator. The remaining portion was compounded in an identical manner except that cadmium diethyldithiocarbamate was used as the primary accelerator, as follows:

| Sample designation | Milled component, amount (basis 100 parts by wt. polymer) | |
|---|---|---|
| | 16 | 17 |
| Sulfur | 0.4 | 0.4 |
| Mixed $C_{1-2}$-tetraalkyl thiuram disulfide | | 2.25 |
| Cadmium diethyldithiocarbamate | 2.0 | |
| N-cyclohexyl-2-benzothiazole sulfenamide | | 1.75 |
| Mercaptobenzothiazole disulfide | 3.5 | |
| Cadmium oxide | 3.5 | 3.5 |
| Magnesium oxide | 10.0 | 10.0 |
| Stearic acid | 1.5 | 1.5 |
| Carbon black | 25.0 | 25.0 |
| Hydrated silica, precipitated | 25.0 | 25.0 |

Upon completion of compounding, each of the compounded rubbers was tested for its curing characteristics on a Mooney Rheometer in accordance with ASTM Test Procedure D-1646-68 at 250° F. The time to obtain a five (5) point increase in Mooney viscosity was only 8.0 minutes for the rubber accelerated with cadmium diethyldithiocarbamate, whereas the rubber in accordance with the invention took 21.4 minutes to obtain the same increase in Mooney viscosity. Thus, the rubber in accordance with the invention was much less scorchy and would allow quite ample time for processing, compounding and molding before it becomes too viscous.

What is claimed is:

1. A sulfur-vulcanizable elastomer mixture comprising (a) a sulfur-vulcanizable elastomer and, basis 100 parts by weight of the elastomer, (b) from about 0.02 to about 2.0 parts of sulfur, (c) 4-30 parts of a bivalent metal oxide activator system comprising 2-10 parts of cadmium oxide as the primary activator and 2-20 parts of magnesium oxide as the secondary activator, (d) from about 0.2 to about 8 parts of tetra-$C_{1-4}$-alkyl thiuram disulfide accelerator and (e) from about 1 to about 15 parts of a mixture of antioxidants comprising (1) a polyether polythioether and (2) a high boiling aromatic amine in which the weight ratio of (1) to (2) is from about 1:1 to about 10:1, said polyether polythioether having the general formula

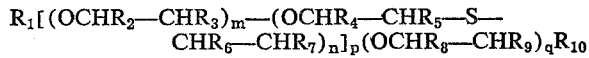

in which $R_1$ and $R_{10}$ are selected from a hydrogen atom, a cycloalkyl, acyl, aryl or alkyl radical containing from 1 to 22 carbon atoms; $R_2$ to $R_9$ are selected from a hydrogen atom, an alkyl, cycloalkyl or aryl radical; $m$ and $q$ are integers from 0 to 50 and $n$ and $p$ are integers from 1 to 50.

2. The elastomer mixture of claim 1 in which the polyether polythioether has the formula

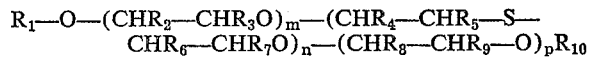

in which $R_1$ and $R_{10}$ are selected from linear and branched alkyl radicals containing from 3 to 18 carbon atoms; $R_2$ to $R_9$ are selected from a hydrogen atom and linear or branched alkyl radicals containing from 1 to 12 carbon atoms; and $m$, $n$ and $p$ are integers from 1 to 10.

3. The elastomer mixture of claim 1 in which the mixture of antioxidants contains an aromatic amine selected from the group consisting of trimer of 2,2,4-trimethyl-1,2-dihydroquinoline, 2-mercaptobenzimidazole, octylated diphenylamine, condensation products of aniline and β-naphthol, condensation products of diphenylamine and acetone, N,N'-diphenyl-p-phenylenediamine, phenyl-α-naphthylamine resin and phenyl-β-naphthylamine and mixtures thereof.

4. The elastomer mixture of claim 1 in which the sulfur is provided by a sulfur donor.

5. The elastomer mixture of claim 4 in which the sulfur-containing organic compound is selected from the group consisting of 4,4'-dithiodimorpholine, alkyl phenol disulfides and mixtures thereof.

6. The elastomer mixture of claim 1 in which the tetra-$C_{1-4}$-alkyl thiuram disulfide is comprised of mixed methyl and ethyl tetraalkyl thiuram disulfides.

7. The elastomer mixture of claim 1 in which the sulfur-vulcanizable elastomer is a copolymer of butadiene and acrylonitrile and sulfur is supplied by elemental sulfur, the elemental sulfur being present in amount of 0.2–0.5 parts.

8. The elastomer mixture of claim 4 in which the sulfur-vulcanizable elastomer is a copolymer of butadiene and acrylonitrile.

9. A sulfur-vulcanized elastomer produced by heat curing the sulfur-vulcanizable elastomer composition of claim 1.

References Cited

UNITED STATES PATENTS

| | | | |
|---|---|---|---|
| 3,163,620 | 12/1964 | Brachel et al. | 260—30.8 |
| 2,849,452 | 8/1958 | Webb | 260—288 |
| 3,296,185 | 1/1967 | Cathey et al. | 260—41.5 |
| 3,332,915 | 7/1967 | Corrigall | 260—79.5 |
| 2,892,805 | 6/1959 | Tomlin et al. | 260—41.5 |
| 2,912,407 | 11/1959 | Reynolds | 260—33.6 |
| 2,727,935 | 12/1955 | Kloepfer | 260—765 |
| 2,968,640 | 1/1961 | Gregg, Jr. | 260—41.5 |
| 3,595,923 | 7/1971 | Schmelzer et al. | 260—609 |
| 3,644,590 | 2/1972 | Coulthard | 260—894 |

OTHER REFERENCES

"Vanderbilt Rubber Handbook," 1958, pp. 172 and 173.
Whitby, "Synthetic Rubber," 1954, p. 802.

DONALD E. CZAJA, Primary Examiner

R. A. WHITE, Assistant Examiner

U.S. Cl. X.R.

260—30.8 R, 41.5 R, 45.7 S, 45.9 R, 79.5 B, 79.5 C, 83.3